(12) United States Patent  (10) Patent No.: US 7,552,941 B2
Yamauchi et al.  (45) Date of Patent: Jun. 30, 2009

(54) AIRBAG APPARATUS

(75) Inventors: Koji Yamauchi, Aichi-ken (JP);
Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/000,212

(22) Filed: Dec. 11, 2007

(65) Prior Publication Data

US 2008/0143087 A1   Jun. 19, 2008

(30) Foreign Application Priority Data

Dec. 18, 2006   (JP) .............................. 2006-340084

(51) Int. Cl.
*B60R 21/26* (2006.01)
(52) U.S. Cl. ...................................... 280/742
(58) Field of Classification Search ................. 280/738, 280/739, 740, 741, 742
See application file for complete search history.

(56) References Cited

U.S. PATENT DOCUMENTS 5,375,874 A * 12/1994 Zushi ....................... 280/728.3
5,853,192 A * 12/1998 Sikorski et al. ............. 280/739
6,406,055 B1 * 6/2002 Faigle et al. .............. 280/728.2
6,435,549 B1 * 8/2002 Ochiai ........................ 280/735
6,547,274 B2 * 4/2003 Ochiai ........................ 280/735
6,550,807 B1 * 4/2003 Faigle et al. ................ 280/739
6,588,795 B2 * 7/2003 Fischer et al. ............... 280/736
6,669,231 B2 * 12/2003 Ryan .......................... 280/736
6,799,777 B2 * 10/2004 Hawthorn et al. ........... 280/742
2006/0033316 A1   2/2006 Keutz
2006/0066083 A1   3/2006 Keutz

\* cited by examiner

*Primary Examiner*—John Q. Nguyen
*Assistant Examiner*—Robert A. Coker
(74) *Attorney, Agent, or Firm*—Posz Law Group, PLC (57) ABSTRACT

The airbag apparatus includes a case for housing and holding an airbag and an inflator. The case includes a vent opening for releasing inflation gas filled inside the airbag and a lid operated by an actuator for closing and opening the vent opening. The lid is pivotally supported at a periphery of the vent opening for rotation about its rotary shaft disposed across the vent opening, and includes an outward-opening area adapted to rotate outward of the case and an inward-opening area adapted to rotate inward of the case, with a border of the outward-opening area and inward-opening area disposed on the rotary shaft. A sliding element is connected to the actuator for holding the lid to keep the vent opening closed when the actuator is inactive and for sliding movement to release the lid and open the vent opening upon operation of the actuator.

6 Claims, 8 Drawing Sheets

AIRBAG APPARATUS

The present application claims priority from Japanese Pat. Application No. 2006-340084 of Yamauchi et al., filed on Dec. 18, 2006, the disclosure of which is hereby incorporated into the present application by reference.

BACKGROUND OF THE INVENTION

1. Field of the Invention

The present invention relates to an airbag apparatus including an inflatable airbag for protecting a vehicle occupant In particular, the invention relates to an airbag apparatus further including a case for housing the airbag and an inflator, which case having a lid operable for exhausting inflation gas once filled inside the airbag.

2. Description of Related Art

Conventional airbag apparatuses are known, from US 2006/0066083 A1 and US 2006/0033316 A1, as each has an airbag inflatable with inflation gas, an inflator for supplying the inflation gas to the airbag, and a case for housing and holding the airbag and the inflator. The case includes a vent opening for allowing inflation gas inside the airbag to escape and a lid for closure of the vent opening and rotatable upon the operation of an actuator to open the vent opening.

In these apparatuses, the lids are configured to open the vent openings upon the activation of the actuator so inflation gas is released from the openings to reduce the internal pressure of the airbag in order that less reaction force is applied to a vehicle occupant by the airbag when the airbag inflated by the inflator receives the occupant.

In each of these apparatuses, the rotary shaft about which the lid opens is located at the end of the lid. That is, when the lid turns and opens around the rotary shaft, a leading end area of the lid facing away from the rotary shaft is separated away from the periphery of the vent opening orthogonally to the opening plane of the vent opening.

In order to secure good closing property, it is required that the entire outer edge of the lid is pressed onto the periphery of the vent opening on the outer side of the case. If the vent opening has a large opening area, it is difficult to impose the entire outer edge of the lid against the periphery of the vent opening in an even manner. Furthermore, if the vent opening has a large opening area, the lid has to be large as well. The large lid enlarges the turning radius of the lid, thereby enlarging the protrusion of the lid out of the case upon opening of the lid. In this case further measures have to be taken to prevent the lid from engaging surrounding parts of vehicle.

SUMMARY OF THE INVENTION

An object of the present invention is to provide an airbag apparatus having an improved closing property of the lid for closing off the vent opening, and in which the lid protrudes less out of the case upon opening.

The airbag apparatus of the invention includes an airbag inflatable with inflation gas, an inflator for supplying inflation gas to the airbag, a case for housing and holding the airbag and the inflator, and a vent mechanism operated by an actuator for exhausting inflation gas filled inside the airbag. The vent mechanism includes a vent opening, a lid for closing the vent opening and a closing mechanism. The vent opening is formed on the case for releasing the inflation gas filled inside the airbag. The lid is formed on the case and pivotally supported at a periphery of the vent opening by its rotary shaft disposed across the vent opening, for rotation about the rotary shaft to open the vent opening. The lid includes an outward-opening area adapted to rotate outward of the case and an inward-opening area adapted to rotate inward of the case, with a border of the outward-opening area and inward-opening area disposed on the rotary shaft. The closing mechanism is connected to the actuator and holds the lid to keep the vent opening closed when the actuator is inactive and releases the lid to open the vent opening upon operation of the actuator.

In operation, the actuator operates the closing mechanism to release the lid so that the lid rotates about the rotary shaft and opens the vent opening in such a manner as to rotate the outward-opening area outwardly away from the periphery of the vent opening and rotate the inward-opening area inwardly away from the periphery of the vent opening. Hence the inflation gas is exhausted from the case, i.e., from the airbag via the vent opening, thereby reducing the internal pressure of the airbag.

Upon opening of the vent opening by the lid, it is only the outward-opening area that protrudes from the case upon opening of the vent opening. The outward-opening area does not cover the entire area of the vent opening, and therefore, the protrusion of the lid out of the case is reduced in comparison with a conventional lid which is configured to open outwardly as a whole in order to uncover a vent opening fully, even when the entire area of the vent opening is opened with the outward-opening area as well as the inward-opening area of the lid turned, since the turning radius of the outward-opening area is small.

On the other hand, when the lid is held by the closing mechanism and closes off the vent opening, the internal pressure of the airbag is applied to the inward-opening area so the inward-opening area is pressed against the periphery of the vent opening. Therefore, good blocking property is secured. At this time, the outward-opening area, which has to press the periphery of the vent opening from the exterior of the case so as to keep closing the vent opening, does not occupy the entire area of the lid, but has a smaller turning radius and a smaller area in comparison with the conventional lid configured to open outwardly as a whole in order to uncover the vent opening fully. This configuration helps inhibit deformation of the outward-opening area and helps the entire rim of the outward-opening area to be held down onto the periphery of the vent opening in an even manner, thereby improving the blocking property of the whole lid at closing off the vent opening.

Therefore, the airbag apparatus of the invention has an improved closing property of the lid for closing off the vent opening, and the protrusion of the lid out of the case upon opening is reduced as well.

The rotary shaft of the lid is desirably disposed to extend across the center of the vent opening so that the outward-opening area and inward-opening area close off equal areas of the vent opening.

When the lid rotates to open the vent opening, this configuration helps equalize an outward-opening force of the outward-opening area that is pressured by the inflated airbag to open and a closing force of the inward-opening area that is pressured by the airbag to stay closed, even considering the increase of the internal pressure of the airbag. Accordingly, the pressure required to keep the lid closing the vent opening is alleviated, while the lid can be opened with less turning force as well. That is, this configuration helps reduce the energy required to keep closing the lid and open the lid.

The case may include more than one lids. In that case, the lids are desirably arranged in such a relation to an inlet opening of the airbag for admitting inflation gas that the lids provide equal areas permitting inflation gas to be exhausted relative to the center of the inlet opening of the airbag at opening the vent opening.

This arrangement helps release inflation gas in a well-balanced manner with respect to the inlet opening of the airbag when all the lids open, thereby reducing the internal pressure of the airbag without inflating the airbag disproportionately.

In the above instance, the arrangement of gas discharge ports of the inflator is desirably such that areas permitting discharge of inflation gas are even relative to the center of the inlet opening of the airbag.

With this arrangement, the supply of inflation gas into the airbag and the emission of the inflation gas from the vent openings proceed without such an adverse effect that the airbag is inflated disproportionately when the inflation gas is discharged from the discharge ports of the inflator with all the lids opened.

In the above instance where the case includes more than one lids, the closing mechanism is desirably designed to conduct the hold and release of all the lids at the same time. This configuration conduces to open all the vent openings at the same time, thereby reducing the internal pressure of the airbag further without disproportionate inflation of the airbag This configuration is realized by a sliding element constituting the closing mechanism which is disposed on an outer side of the case for sliding movement in parallel with opening planes of the vent openings upon operation of the actuator and an engaging strip formed on each of the lids for engagement with the sliding element. The engaging strip is disposed at a leading end of the outward-opening area of the lid facing away from the rotary shaft and located outside of the case. The sliding element includes slots engageable with the engaging strips. Each of the slots has a regulating surface for regulating the engaging strip to keep the outward-opening area of the lid closing off the vent opening before the sliding movement of the sliding element and a guide surface extending diagonally with respect to the opening plane of the vent opening for sliding on the engaging strip to guide the outward-opening area of the lid to open upon the sliding movement of the sliding element.

With this configuration, before the operation of the actuator or before the movement of the sliding element, the regulating surfaces of the slots support the engaging strips of the lids so that the lids keep closing the vent openings. When the actuator operates to move the sliding element along the opening planes of the vent openings, the engaging strips of the lids slide on the guide surfaces of the slots, so that the outward-opening areas as well as the inward-opening areas rotate about the rotary shafts and thereby the lids open the vent openings.

That is, the simple configuration to move the sliding element by the actuator rotates and opens all the closed lids easily at the same time with the same opening areas.

In the above configuration, it is desired that a rib for guiding the opening of the inward-opening area is formed on the periphery of each of the vent openings on the inner side of the case, on which periphery an outer edge of the inward-opening area of the lid abuts when the lid closes off the vent opening. Such a guide rib will help open each of the lids smoothly without twisting though the sliding element moves in parallel with the opening planes of the vent openings for pushing open the outward-opening areas.

Furthermore, if the lid is designed such that the rim of the outward-opening area is pressed against the periphery of the vent opening on the outer side of the case while the rim of the inward-opening area is pressed against the periphery of the vent opening on the inner side of the case when the lid closes off the vent opening, the lid will seal off the vent opening in a hermetic manner.

In addition, if the outward-opening area and inward-opening area of the lid are provided with reinforcing ribs along respective rims, the lid will be prevented from deformation due to high-pressure gas filling up the case, thereby making the opening and closing of the lid smoothly.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
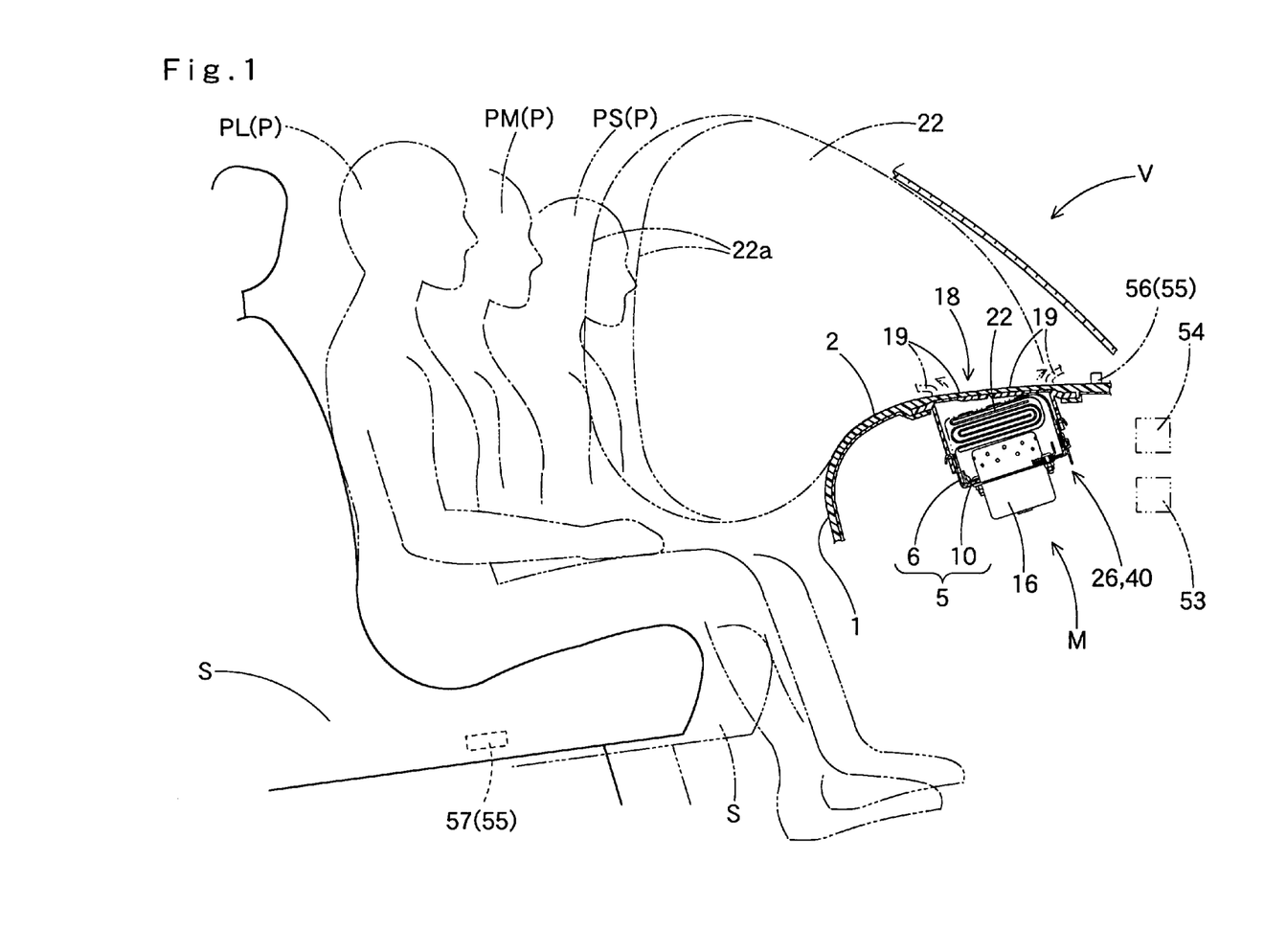
FIG. 1 is a schematic vertical section of an airbag apparatus embodying the present invention in use taken along the longitudinal direction of a vehicle.

As shown in FIG. 1, an airbag apparatus M embodying the present invention is illustrated for descriptive purposes as is mounted in front of a front passenger's seat. In particular, the airbag apparatus M is mounted on atop plane 2 of an instrument panel or dashboard 1 in front of the front passenger's seat S, and is operable under control of a control device 53.

Unless otherwise specified, up/down, front/rear, and left/right directions in this specification are intended to refer to up/down, front/rear, and left/right directions of a vehicle V equipped with the airbag apparatus M and steered straight ahead.

The control device 53 is connected with a crash sensor 54 such as an acceleration sensor for monitoring the deceleration of the vehicle V upon an actual impact and occupant sensors 55 for monitoring the seating position and weight of a vehicle occupant P. In the following embodiment, a position sensor 56 measuring a distance between the airbag apparatus M and the occupant P seated in the front passenger's seat S and a weight sensor 57 determining the weight of the seated occupant P are used as the occupant sensors 55 by way of example. The control device 53 activates an inflator 16 of the airbag apparatus M upon detection of an impact on the vehicle V based upon signals fed from the crash sensor 54. Following the activation of the inflator 16, the device 53 further activates a later-described actuator 51 (FIGS. 3 and 4) based upon signals fed from the position sensor 56 and the weight sensor 57.

Figure 2:
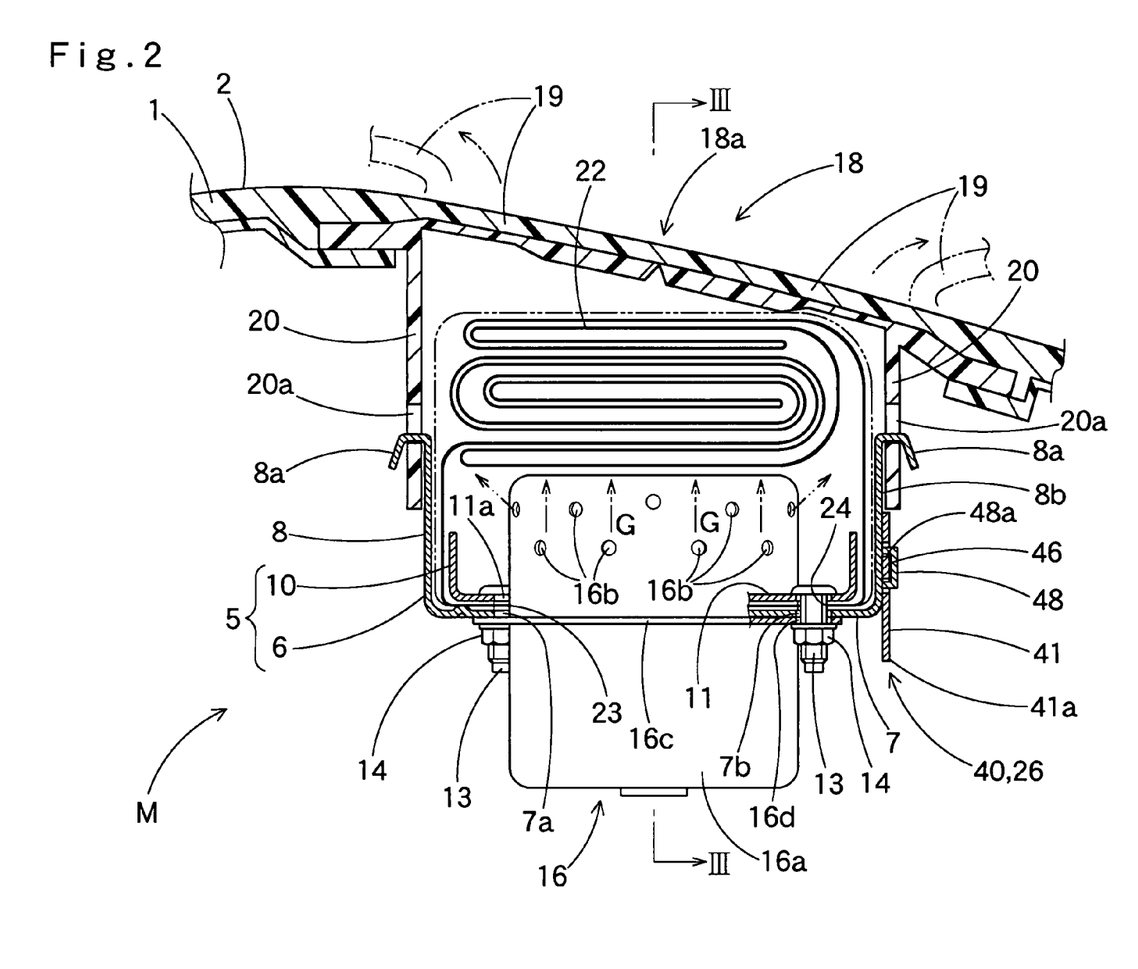
FIG. 2 is a schematic enlarged vertical section of the airbag apparatus of FIG. 1 taken along the longitudinal direction of the vehicle.
Figure 3:
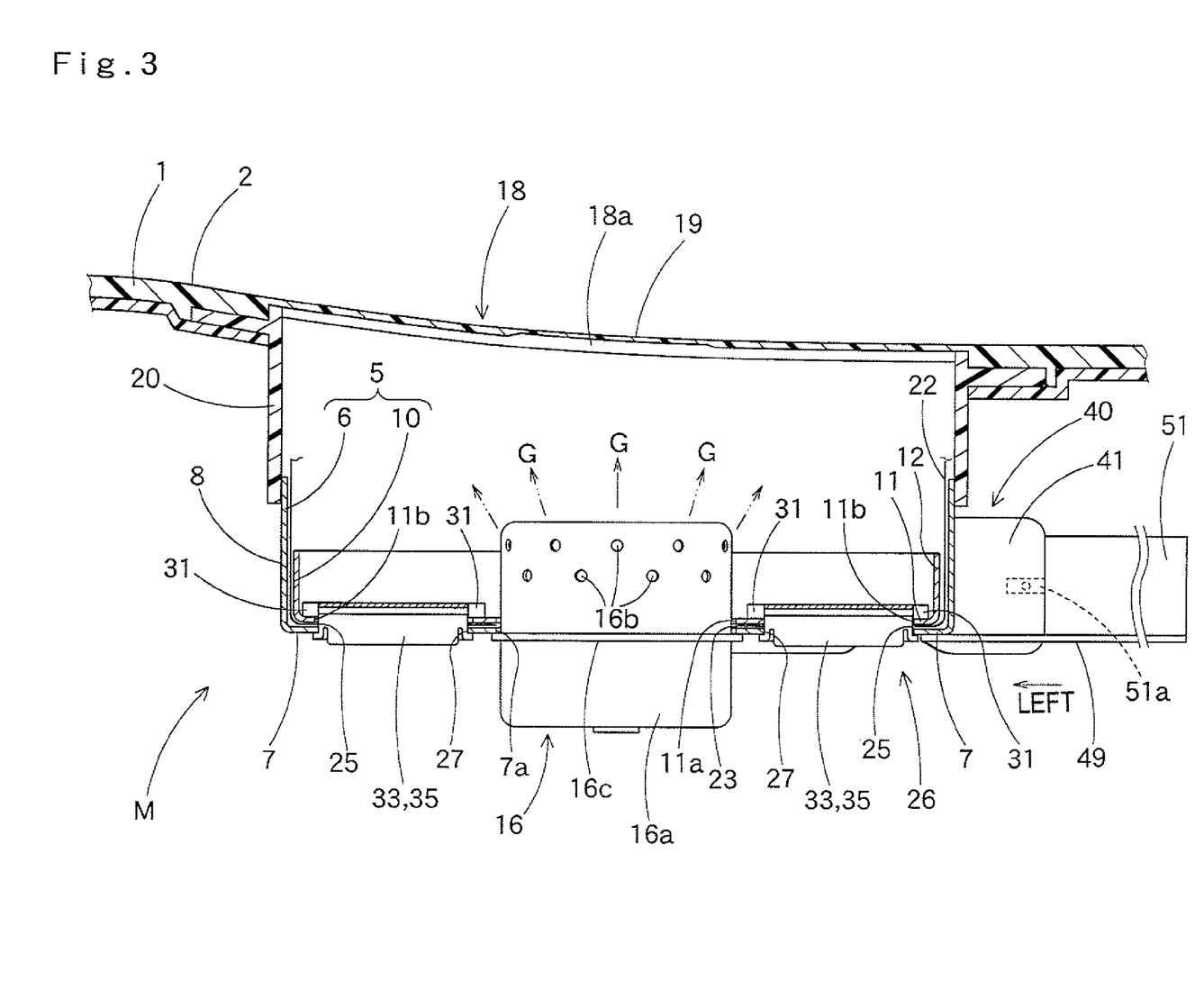
FIG. 3 is a schematic enlarged vertical section of the airbag apparatus of FIG. 1 taken along line III-III of FIG. 2.
Figure 4:
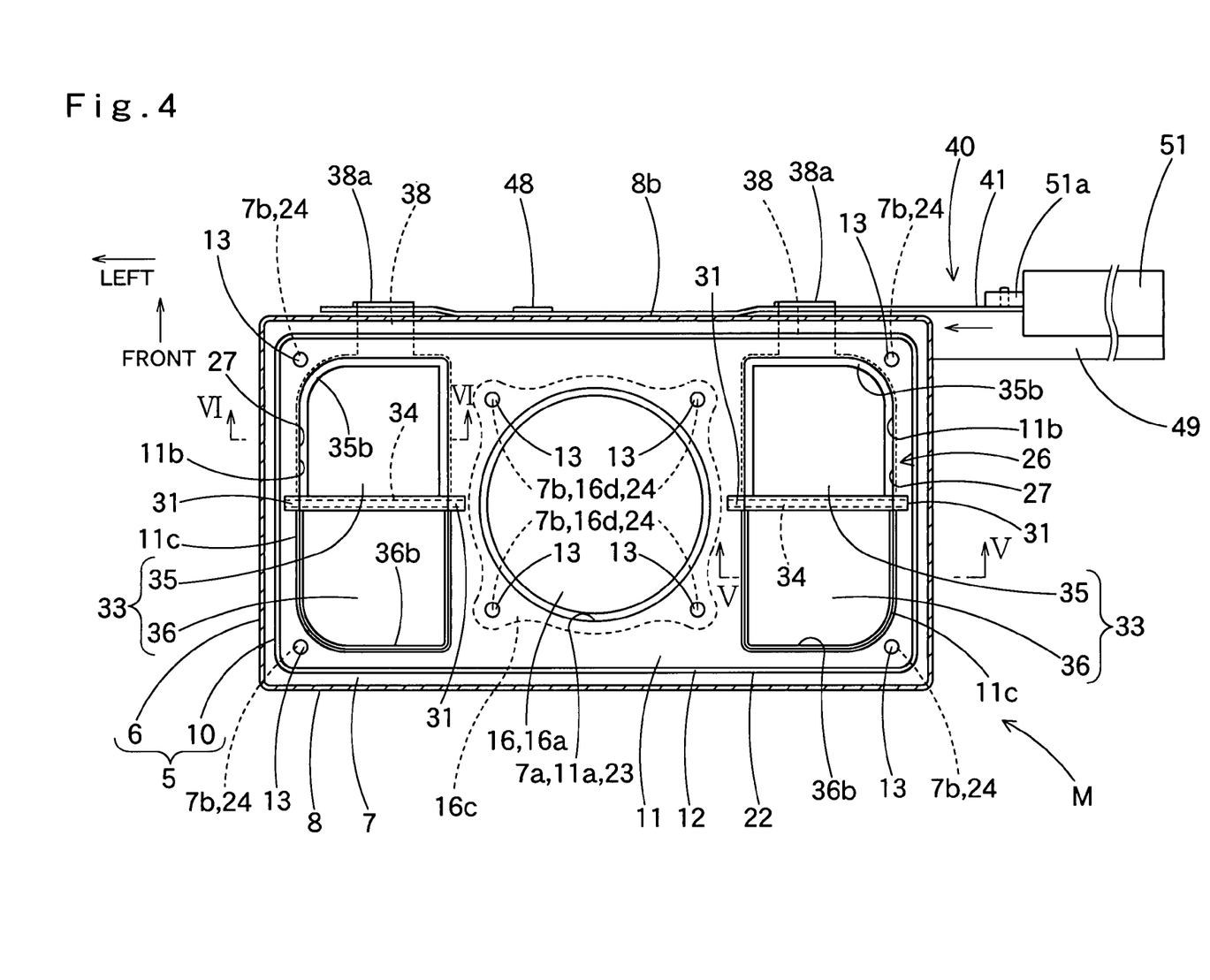
FIG. 4 is a cross section of the airbag apparatus of FIG. 1.

As shown in FIGS. 1-3, the airbag apparatus M includes a folded airbag 22, an inflator 16 for supplying the airbag 22 with inflation gas, a case 5 housing and holding the airbag 22 and the inflator 16, and an airbag cover 18 coupled to the case 5 to cover the folded airbag 22. The airbag apparatus M further includes a vent mechanism 26 for allowing inflation gas G fed into the airbag 22 to flow out of the case 5 and an actuator 51 to activate the vent mechanism 26 as shown in FIGS. 3 and 4. The case 5 includes a case body 6 and a retainer 10 for attaching the airbag 22 and the inflator 16 to the case body 6 utilizing nuts 14.

The airbag 22 is fabricated of woven fabric of polyester, polyamide or the like into a bag shape. As shown in FIG. 1, when inflated by itself, the airbag 22 is formed into a generally square conical shape whose top is located at the foremost region. The rear end region of the airbag 22 located at the bottom of the square cone acts as a protection region 22a for receiving an occupant P seated in the front passenger's seat S. The airbag 22 is provided, at a front region of the bottom wall thereof, with an inlet opening 23 having a round contour for introducing inflation gas G. The peripheral area of the inlet opening 23 is depressed by a bottom wall 11 of the retainer 10 and is attached to a bottom wall 7 of the case body 6 (FIG. 2). Around the inlet opening 23 are through holes 24 (FIG. 4) for receiving bolts 13 of the retainer 10 and apertures 25 corresponding to later-described vent openings 27 formed on the bottom wall 7 of the case body 6 (FIG. 3).

The airbag 22 of this specific embodiment is not provided with vent holes for exhausting inflation gas which airbags usually have. However, it may be provided with such vent holes in view of preventing the burst upon excessive increase of internal pressure.

The inflator 16 is activated by the control device 53 when the device 53 detects an impact on the vehicle V based on signals from the crash sensor 54. As shown in FIGS. 2 and 3, the inflator 16 includes a columnar body 16a having gas discharge ports 16b to discharge inflation gas G and a generally square annular flange 16c projecting from the outer circumference of the body 16a. The discharge ports 16b individually have the same opening areas and are arranged radially and equally on the top area of the outer circumference of the body 16a so that areas permitting discharge of inflation gas G are even relative to the inlet opening 23 of the airbag 22. The flange 16c includes apertures 16d for receiving bolts 13 of the retainer 10 as shown in FIGS. 2 and 4. The flange 16c is arranged to butt against the lower side of the bottom wall 7 of the case body 6 at a region around a later-described insertion hole 7a while the bolts 13 of the retainer 10 are inserted through the apertures 16d. The bolts 13 are then fastened with the nuts 14, thereby securing the inflator 16 to the case body 6.

As shown in FIGS. 2 and 3, the airbag cover 18 is integral with the dashboard 1 of synthetic resin in this specific embodiment, and is disposed to cover the folded airbag 22 from above. The airbag cover 18 includes two doors 19 openable towards the front and rear and a thinned tearable region 18a disposed around the doors 19. The doors 19 are adapted to open when pushed by the airbag 22 upon airbag inflation by breaking the tearable region 18a. The airbag cover 18 is further provided around the doors 19 with a joint wall 20 for joint with the case 5. The joint wall 20 includes retaining holes 20a engageable with lugs 8a of a circumferential wall 8 of the case body 6, thereby the airbag cover 18 is coupled to the case 5.

As shown in FIGS. 2-4, the body 6 of the case 5 is made of sheet metal and has a generally rectangular parallelepiped shape for housing the folded airbag 22. The case body 6 includes a bottom wall 7 having a rectangular plate shape and a circumferential wall 8 extending upward from the outer edge of the bottom wall 7 in a square tubular shape. The circumferential wall 8 is provided with a plurality of lugs 8a on the top for retaining the joint wall 20 of the airbag cover 18 (FIG. 2).

The bottom wall 7 is provided with a round insertion hole 7a for insertion of the body 16a of the inflator 16 and through holes 7b for receiving the bolts 13 of the retainer 10. The through holes 7b are disposed around the insertion hole 7a and at the vicinities of four corners of the bottom wall 7. The bottom wall 7 is further provided with unillustrated brackets for attachment of the airbag apparatus M to the vehicle body structure.

The bottom wall 7 further includes vent openings 27 which constitute the vent mechanism 26. In this embodiment, the vent openings 27 each has a rectangular shape extending along the anteroposterior direction and have equal opening areas, and the openings 27 are disposed on bilaterally symmetrical positions with respect to the inlet opening 23 of the airbag 22 attached to the bottom wall 7.

Figure 5:
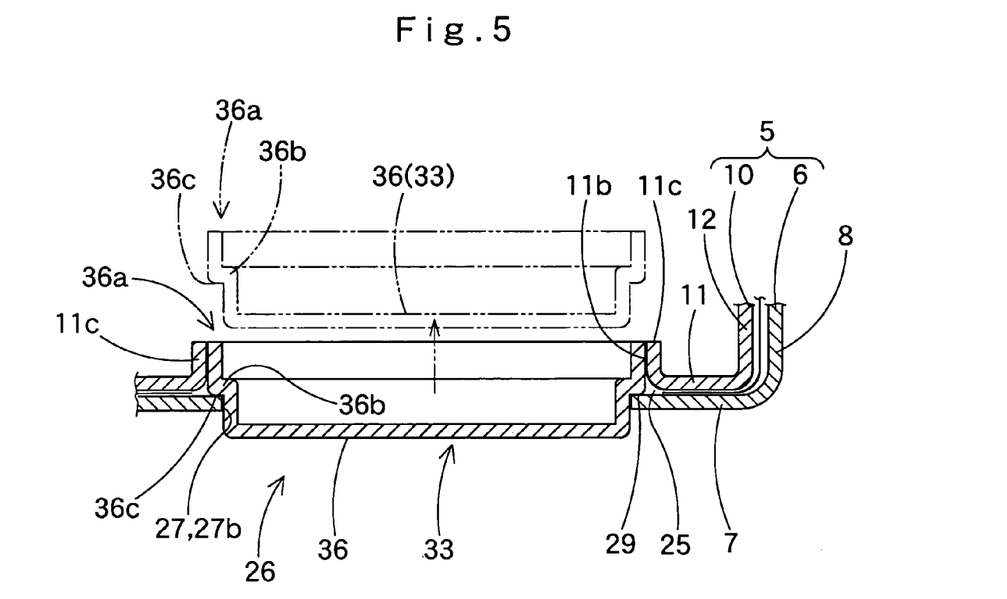
FIG. 5 is a sectional view taken along V-V of FIG. 4 showing an inward-opening area of a lid blocking a vent opening.

The retainer 10 of the case 5 is made of sheet metal and includes a bottom wall 11 arranged over the bottom wall 7 of the case body 6 and a circumferential wall 12 extending upward in a generally square tubular fashion from the peripheral edge of the bottom wall 11, as shown in FIGS. 2-4. The retainer 10 holds down a peripheral area of the inlet opening 23 of the airbag 22 for attachment of the same onto the bottom wall 7 of the case body 6 together with the inflator 16. The retainer 10 is provided with more than one bolts 13 (8 bolts, in this embodiment) projecting downward. Each of the bolts 13 is put through each of through holes 24 of the airbag 22 and each of the through holes 7b of the case body 6. Four of the bolts 13 are further inserted through the apertures 16d of the inflator 16 around the insertion hole 7a of the bottom wall 7 of the case body 6, and then fastened into the nuts 14 so the airbag 22 and the inflator 16 are secured to the case body 6. As shown in FIG. 4, in a similar manner to the bottom wall 7 of the case body 6, the bottom wall 11 is provided with an opening 11a for insertion of the inflator body 16a and openings 11b corresponding to the vent openings 27. The retainer 10 of this embodiment is further provided, at part of the periphery of each of the openings 11b where a later-described inward-opening area 36 of a lid 33 is disposed, with a rib 11c extending upward for guiding the opening of the inward-opening area 36 (FIGS. 4 and 5).

Figure 7A:
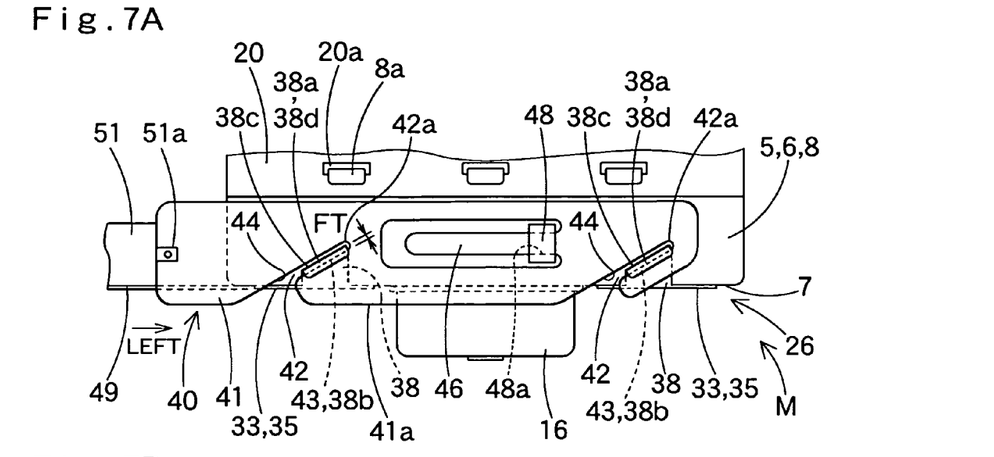
FIGS. 7A, 7B and 7C illustrate the airbag apparatus of FIG. 1 in operation from the front in order.
Figure 7B:
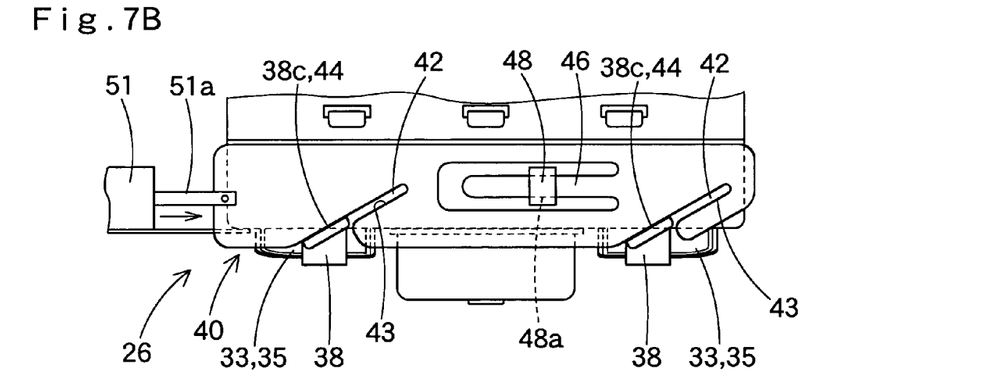
Figure 7C:
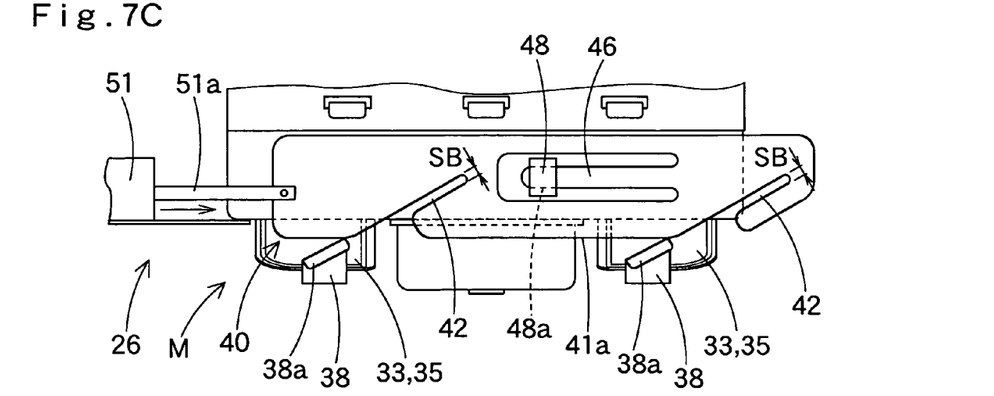

As shown in FIGS. 3 and 4, the actuator 51 is attached to a support plate 49 secured to the lower surface of the bottom wall 7 of the case body 6. The actuator 51 of this embodiment utilizes a micro gas generator. Specifically, the actuator 51 is designed to launch its operating bar 51a along the axial direction of the bar as shown in FIGS. 7A, 7B and 7C by combustion gas generated by ignition of explosive inside the gas generator instantly in response to actuating signals fed from the control device 53. The operating bar 51a is designed to move to the left along the opening planes of the vent openings 27, i.e. along the left-right direction extending along the bottom wall 7 of the case body 6. The leading end of the operating bar 51a is connected to a slider 41 adapted to keep closing later-described lids 33 and make the lids 33 open at the same time. FIGS. 7A, 7B and 7C illustrate the airbag apparatus M from the front side of vehicle, and therefore, the moving direction of the operating bar 51a is the leftward direction of the vehicle V moving straight ahead.

As shown in FIGS. 3 and 4, the vent mechanism 26 includes rectangular vent openings 27 formed on the bottom wall 7 of the case body 6, the lids 33 openably closing the vent openings 27, and a closing mechanism 40 connected to the actuator 51 for controlling the opening action of the lids 33.

The closing mechanism 40 includes a slider 41 disposed at the front face of the circumferential wall 8 of the case body 6 and coupled to the leading end of the operating bar 51a of the actuator 51 and a tubular holding sleeve 48 adapted to hold the slider 41 and to guide the leftward movement of the slider 41.

Referring to FIGS. 4 and 7, the slider 41 has a generally rectangular plate shape elongate in the transverse direction and includes, in the vicinity of its lateral center, a guide rod 46 with its surrounding area cut out. The guide rod 46 is put through the holding sleeve 48 secured to the front wall 8b of the circumferential wall 8 of the case body 6 so it guides the leftward movement of the slider 41. The slider 41 further includes two slots 42 extending diagonally upward and leftward from the lower edge 41a of the slider 41. A lower inner surface of the upper end region 42a of each of the slots 42 acts as a regulating surface 43 (FIG. 7A) for pushing up a later-described engaging strip 38 of the lid 33 in order for the lid 33 to keep closing the vent opening 27. An upper inner surface of each of the slots 42 from the upper end region 42a to the lower edge 41a of the slider 41 acts as a guide surface 44 (FIGS. 7A, 7B, 8A and 8B) for depressing the engaging strip 38 to open the lid 33.

Figure 6:
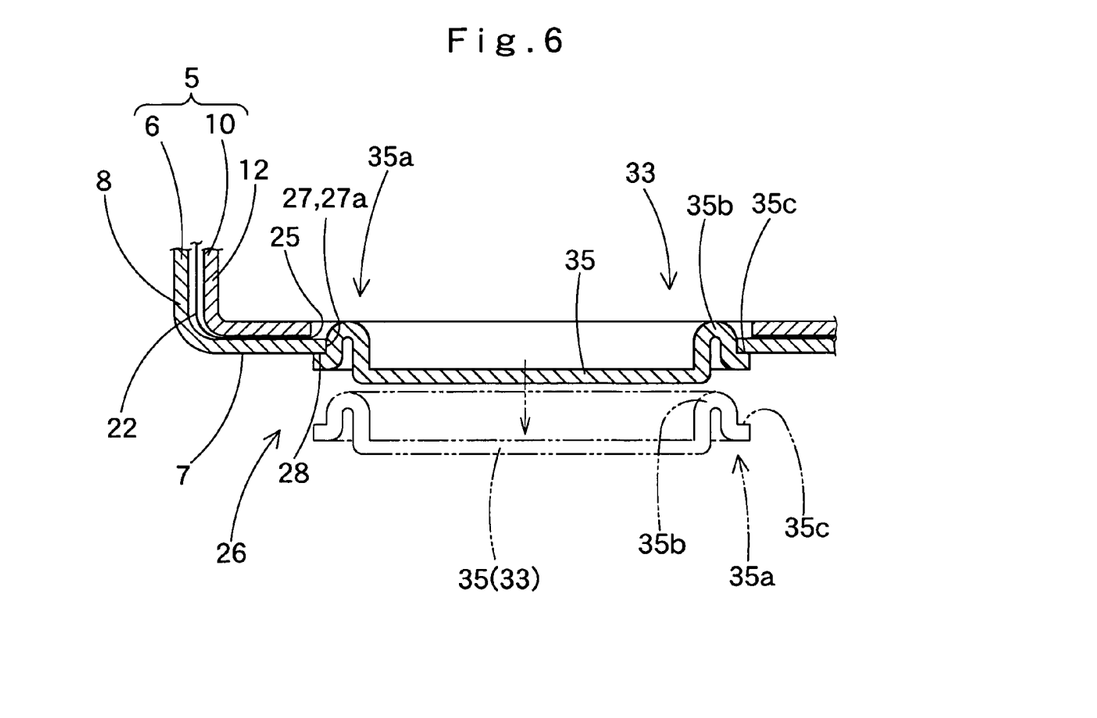
FIG. 6 is a sectional view taken along VI-VI of FIG. 4 showing an outward-opening area of the lid blocking the vent opening.
Figure 8A:
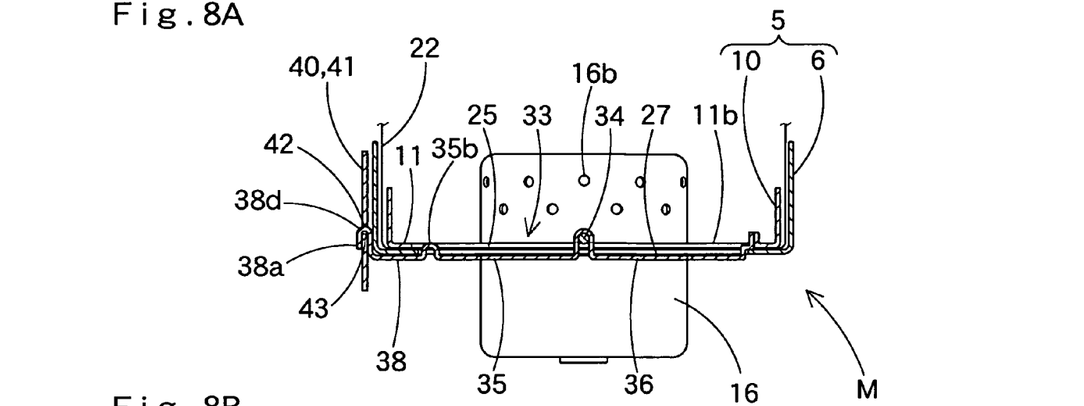
FIGS. 8A, 8B and 8C are sectional views illustrating the airbag apparatus of FIG. 1 in operation in order.
Figure 8B:
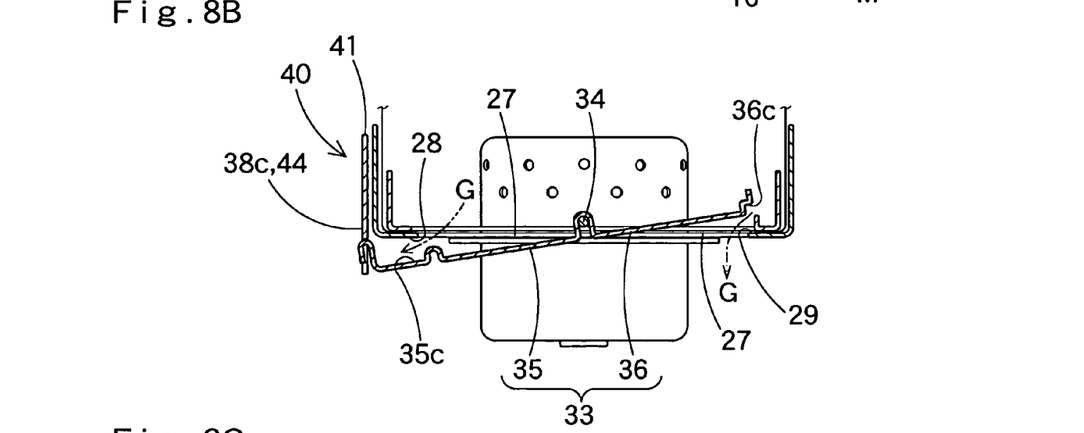
Figure 8C:
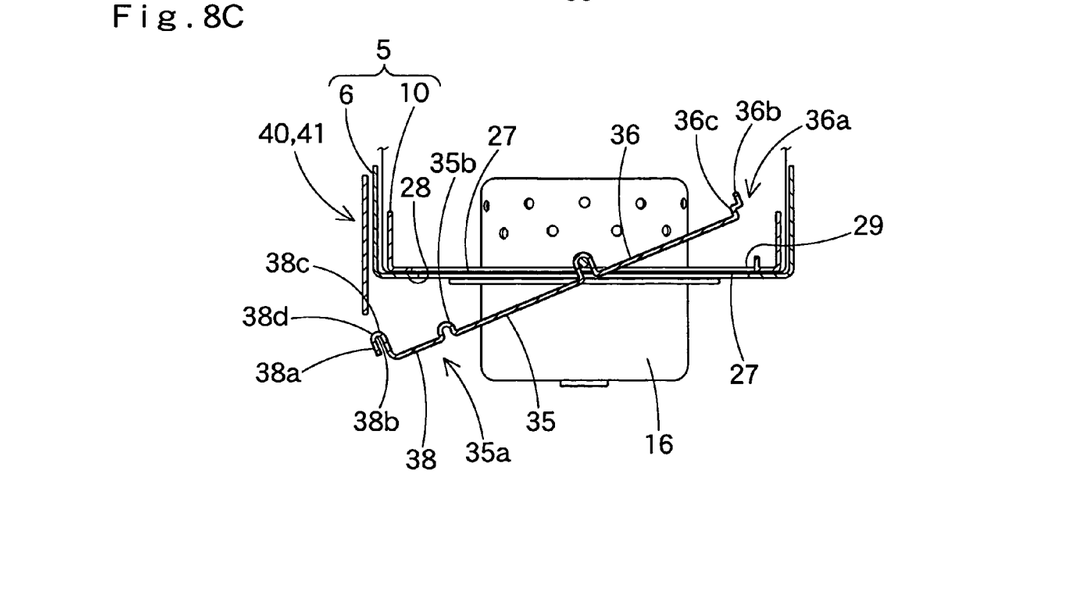

As shown in FIGS. 3, 4 and 8, each of the lids 33 includes a rotary shaft 34 disposed across the vent opening 27 in the lateral direction and which shaft 34 is pivotally supported at opposite ends with a bearing portion 31 disposed on the periphery of the vent opening 27 in the bottom wall 11 of the retainer 10. The lid 33 has a shape of a butterfly valve is composed of a single rectangular plate and includes an outward-opening area 35 disposed at the front for rotating outward of the case 5 and an inward-opening area 36 adapted to rotate inward of the case 5, with the border disposed on the rotary shaft 34, upon opening of the vent opening 27 as shown in FIG. 8. As shown in FIGS. 6 and 8, the outward-opening area 35 includes a seal area 35c on the top surface of the outer edge 35a. When the outward-opening area 35 closes off the vent opening 27, the seal area 35c is pressed against the outside edge 28 of the front area 27a of the vent opening 27 which edge 28 is formed on the lower side of the bottom wall 7 of the case body 6. As shown in FIGS. 5 and 8, the inward-opening area 36 includes a seal area 36c on the lower surface of the outer edge 36a. When the inward-opening area 36 closes off the vent opening 27, the seal area 36c is depressed onto the inside edge 29 of the rear area 27b of the vent opening 27, which edge 29 is formed on the upper side of the bottom wall 7 of the case body 6. The outward-opening area 35 and inward-opening area 36 are respectively provided proximate the seal areas 35c/36c and along the outer edges 35a/36a with reinforcing ribs 35b/36b having bent contours for prevention of deformation.

Each of the outward-opening areas 35 further includes, as shown in FIGS. 4, 7 and 8, the engaging strip 38 engageable with the slots 42 of the slider 41 at the leading end facing away from the rotary shaft 34 or at the front end of the lid 33. Each of the engaging strips 38 extends forward and then upward from the lateral center of the front end of the outward-opening area 35 and is provided at the upper end with a hook-like region 38a bent upward and then downward to have a reverse-U section. When the lid 33 closes off the vent opening 27, an inner surface 38b of the hook-like region 38a is pressed against the regulating surface 43 or the lower inner surface of the slot 42. As the slider 41 moves to the left, an outer surface 38c of the hook-like region 38a slides on the guide surface 44 or the upper inner surface of the slot 42, thereby the hook-like region 38a is depressed so the lid 33 rotates.

The hook-like region 38a is designed to have a thickness FT (FIG. 7A) at its ceiling wall 38d slightly smaller than a width SB of each of the slots 42 (FIG. 7C) and has such a configuration as to extend along the orientation of the slot 42 i.e., as to extend diagonally upward and leftward with respect to the opening planes of the vent openings 27. With this configuration, the lids 33 are held from turning toward the closing direction by the regulating surfaces 43 during the leftward movement of the slider 43 or during the opening motion of the lids 33.

After the airbag apparatus M is mounted on the vehicle V, for example assuming that the control device 53 detected that an occupant P is a light and small occupant PS (refer to triple-dashed lines in FIG. 1) seated proximate the airbag apparatus M based on signals fed from the position sensor 56 and weight sensor 57 and then received a signal from the crash sensor 54 that informs of an impact on the vehicle V, the control device 53 feeds an actuating signal to the inflator 16. Then the inflator 16 operates to discharge inflation gas G from the gas discharge ports 16b, so that the airbag 22 inflates with inflation gas G, breaks the tearable region 18a of the airbag cover 18, opens the doors 19 toward the front and rear, and deploys rearward.

At this time, the control device 53 also activates the actuator 51 to operate the vent mechanism 26 in order to reduce the internal pressure of the airbag 22 so that the airbag 22 exerts less reaction force at receiving the small occupant PS since the control device 53 knows that the occupant P is the light and small occupant PS proximate the airbag apparatus M and has a small kinetic energy in his/her forward motion based on the measurements from the occupant sensors 55.

When the actuator 51 is activated, the operating bar 51a of the actuator 51 protrudes leftward as shown in FIGS. 7A, 7B and 7C. Then the slider 41 of the closing mechanism 40 coupled to the operating bar 51a serially is moved toward the left along the bottom wall 7 of the case 5 so that the guide rod 46 slides along the inner surface 48a (FIG. 2) of the holding sleeve 48. At this time, each of the engaging strips 38 of the outward-opening areas 35 of the lids 33 is pushed downward with the outer surface 38c of the hook-like region 38a sliding on the guide surface 44 or the upper inner surface of the slot 42.

More specifically, as shown in FIGS. 8A, 8B and 8C, if the inner surface 38b of the hook-like region 38a of the engaging strip 38, which has been pressed upward by the regulating surface 43 of the slot 42, is released from the regulating surface 43 and alternatively the outer surface 38c of the hook-like region 38a is pressed downward by the guide surface 44 upon the movement of the slider 41 of the closing mechanism 41 accompanying the operation of the actuator 51, the lid 33 rotates about the rotary shaft 34, so that the closed state of each of the vent openings 27 is shifted to the open state. When each of the vent openings 27 thus opens with the outward-opening area 35 of each of the lids 33 rotating outwardly facing away from the outside edge 28 of the vent opening 27 and with the inward-opening area 36 rotating inwardly away from the inside edge 29 of the vent opening 27, inflation gas G is exhausted from the case 5, i.e., from the airbag 22 via the vent openings 27, so that the internal pressure of the airbag 22 is reduced.

With the lid 33 of this embodiment, it is only the outward-opening area 35 that protrudes from the case 5 upon opening of the vent opening 27. The outward-opening area 35 does not cover the entire area of the vent opening 27, and therefore, the protrusion of the lid 33 out of the case 5 is reduced in comparison with a conventional lid which is configured to open outwardly as a whole in order to uncover a vent opening fully, even when the entire area of the vent opening 27 is opened with the outward-opening area 35 as well as the inward-opening area 36 of the lid 33 turned, since the turning radius of the outward-opening area 35 is small.

Assuming another instance where the control device 53 detected that an occupant P is a large and heavy occupant PL (refer to double-dashed lines in FIG. 1) seated away from the airbag apparatus M based on signals fed from the position sensor 56 and weight sensor 57 and then received a signal from the crash sensor 54 that informs of an impact on the vehicle V, the control device 53 activates only the inflator 16 but not the actuator 51 so that the airbag 22 increases its internal pressure for receiving the large occupant PL having high kinetic energy.

Hence the vent mechanism 26 keeps closing the lids 33. At this time, since the engaging strips 38 are held upward by the regulating surfaces 43 of the slots 42 of the closing mechanism 40, the internal pressure of the airbag 22 is applied to the inward-opening areas 36 so the areas 36 are pressed against the inside edges 29 of the vent openings 27. Therefore, good blocking property is secured. On the other hand, each of the outward-opening areas 35, which has to press the outside edge 28 of the vent opening 27 from the exterior of the case 5 so as to keep closing the vent opening 27, does not occupy the entire area of the lid 33, but has a smaller turning radius and a smaller area in comparison with the conventional lid configured to open wholly outwardly. This configuration helps inhibit deformation of the outward-opening area 35 and helps the seal area 35c formed on the entire outer edge 35a of the outward-opening area 35 to be held down onto the outside edge 28 of the vent opening 27 in an even manner, thereby improving the blocking property of the whole lid 33 at closing off the vent opening 27.

Therefore, the airbag apparatus M of the foregoing embodiment has an improved closing property of the lid 33 for closing off the vent opening 27, and the protrusion of the lid 33 out of the case upon opening is reduced as well.

In case the reaction force of the airbag 22 is likely to become too high during the reception of the large occupant PL, the actuator 51 maybe activated during or immediately before the reception of the occupant PL so the vent openings 27 are opened to reduce the internal pressure of the airbag 22. Further, if the airbag 22 is directed to receive a standard occupant PM (refer to dashed lines in FIG. 1) having a normal weight, the control device 53 may be designed to activate the actuator 51 to open the lid 33 on a suitable timing depending on the kinetic energy of the standard occupant PM based on measurements from the occupant sensors 55 and speed signals.

Figure 9A:
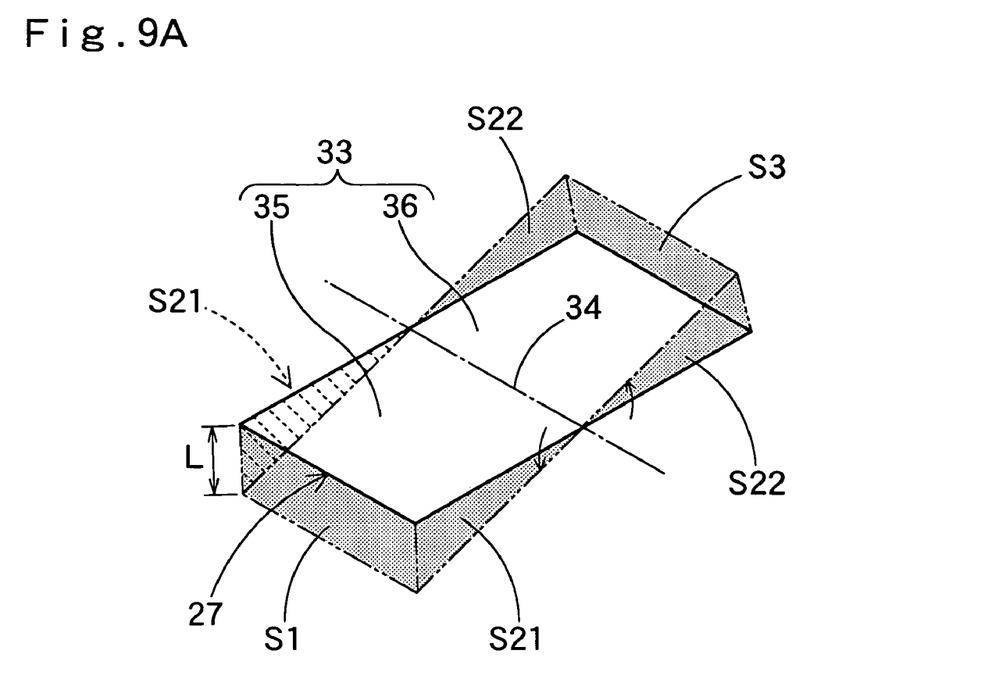
FIGS. 9A and 9B are diagrams explaining opening areas of the lid embodying the invention and of a conventional lid from the outer edge of the vent opening on condition that the protrusions of the two lids from the case are the same.
Figure 9B:
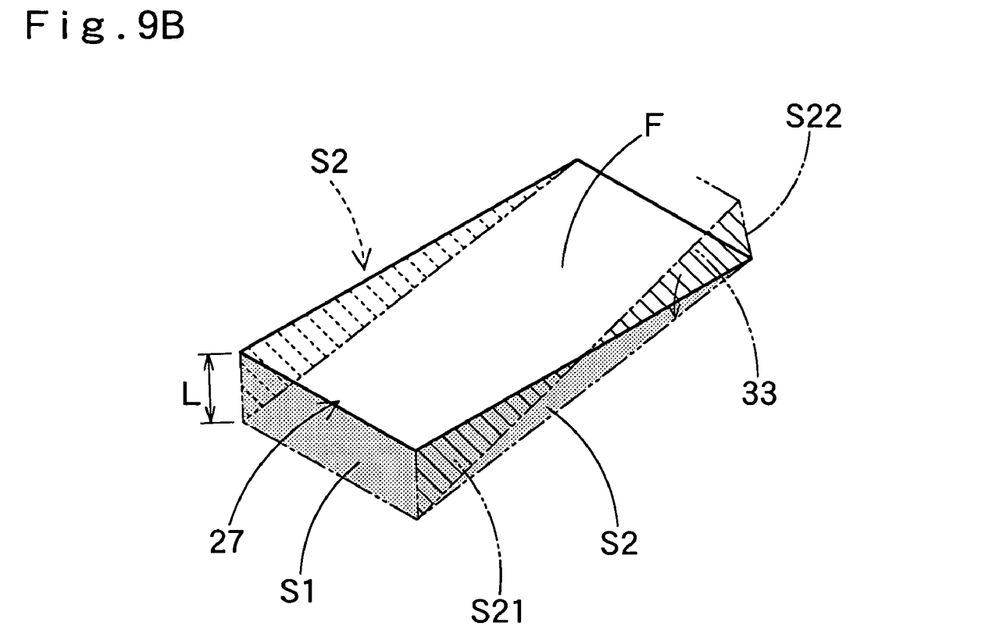

In the airbag apparatus M of the foregoing embodiment, moreover, the lid 33 of the vent mechanism 26 has a smaller turning radius than a conventional lid F that opens wholly outwardly to open the vent opening 27, as shown in FIGS. 9A and 9B. Assuming that protrusions Lout of the case 5 at opening are the same between the lid 33 and the conventional lid F, with respect to opening areas from the periphery of the vent opening 27 to the outer edge of the lid 33/lid F, the openings on the part of the leading ends of the lid 33 (outward-opening area 35) and lid F have the same opening areas S1, while the openings areas S2 on the sides are generally the same as well with respect that S2≈S21+S22. As a result, the lid 33 embodying the invention has a greater opening area than that of the conventional lid F generally by the opening area S3 on the leading end of the inward-opening area 36. If the emission of inflation gas G is proportional to the opening area from the periphery of the vent opening 27 to the outer edge of the lid 33/lid F, this means that the lid 33 releases inflation gas G more swiftly than the conventional lid F generally approximately by the opening area S3, thereby improving the response at release of inflation gas G relative to the protrusion of the lid 33 out of the case 5.

Furthermore, the rotary shaft 34 of each of the lids 33 is disposed to extend across the center of the vent opening 27, and the outward-opening area 35 and inward-opening area 36 close equal areas of the vent opening 27. When the lid 33 rotates to open the vent opening 27, this structure helps equalize an outward-opening force of the outward-opening area 35 that is pressured by the inflated airbag 22 to open outwardly and a closing force of the inward-opening area 36 that is pressured by the airbag 22 to stay closed even considering the increase of the internal pressure of the airbag 22. Accordingly, the pressure required to keep the lid 33 closing the vent opening 27 is alleviated, while the lid 33 can be opened with a small turning force of the lid 33 as well. That is, this configuration helps reduce the energy required for keep closing the lid 33 and opening the lid 33, thereby improving the operationality of the lid 33.

In the foregoing embodiment, the case 5 includes more than one (two, in this specific embodiment) lids 33. The lids 33 are arranged bilaterally symmetrical relative to the inlet opening 23 of the airbag 22 for admitting inflation gas G so as to block the vent openings 27 having the same opening areas such that each of the lids 33 provides equal area permitting inflation gas G to be exhausted relative to the center of the inlet opening 23 of the airbag 22 at opening the vent openings 27. This arrangement helps release inflation gas G in a well-balanced manner with respect to the inlet opening 23 of the airbag 22 when all the lids 33 open, thereby reducing the internal pressure of the airbag 22 without inflating the airbag 22 disproportionately.

Especially, the discharge ports 16b of the inflator 16 also individually have the same opening areas and are arranged radially and equally on the inflator 16 so that areas permitting discharge of inflation gas G are even relative to the center of the inlet opening 23 of the airbag 22. With this arrangement, the supply of inflation gas G into the airbag 22 and the emission of the inflation gas G from the vent openings 27 proceed without such an adverse effect that the airbag 22 is inflated disproportionately when the inflation gas G is discharged from the discharge ports 16b of the inflator 16 with all the lids 33 opened.

Although the two lids 33 in the foregoing embodiments are arranged bilaterally symmetric with the outward-opening areas 35 both disposed anteriorly, the lids may also be arranged symmetric about the center of the inlet opening 23 or symmetric anteroposteriorly so as to block the vent openings 27 having the same opening areas on condition that equal opening areas permitting the inflation gas G to be exhausted are provided relative to the center of the inlet opening 23 at opening of the lids 33. Moreover, if the vent mechanism 26 includes three or more vent openings 27 and according number of lids 33, the lids 33 have only to be formed to the size of the opening area of each of the vent openings 27 and arranged radially or symmetrically such that equal areas permitting exhaust of the inflation gas G are provided with respect to the center of the inlet opening 23 at opening of the lids 33, which will inhibit the airbag 22 from inflating disproportionately. It will also be appreciated, in another instance where the airbag device M includes more than one inflator 16, to design the number, size, and arrangement of the gas discharge ports 16b such that areas permitting discharge of inflation gas G are even, i.e., the discharge rate of the inflation gas G is equal relative to the center of the inlet opening 23 of the airbag 22.

In the foregoing embodiment, furthermore, the closing mechanism 40 is designed to keep all the lids 33 closed at the same time and to operate to rotate them at the same time. This configuration conduces to open all the vent openings 27 at the same time, thereby reducing the internal pressure of the airbag 22 further without disproportionate inflation of the airbag 22.

Especially in the foregoing embodiment, the closing mechanism 40 includes the slider 40 disposed on the front or outer side of the front wall 8b of the case 5 and connected to the operating bar 51a of the actuator 51 for sliding movement in parallel with the bottom wall 7 arranged in parallel with the opening planes of the vent openings 27 and along the serially-disposed rotary shafts 34 of the lids 33 having the same contours upon operation of the actuator 51. Moreover, each of the lids 33 includes the engaging strip 38 for engagement with the slider 41 at the leading end of the outward-opening area 35 facing away from the rotary shaft 34 and located outside of the case 5. In addition, the slider 41 includes the slots 42 engageable with the engaging strips 38 and each of the slots 42 has the regulating surface 43 for regulating the engaging strip 38 to keep the outward-opening area 35 closing off the vent opening 27 before the sliding movement of the slider 41 and the guide surface 44 extending diagonally with respect to the opening plane of the vent opening 27 for sliding on the engaging strip 38 to guide the outward-opening area 35 to open upon the sliding movement of the slider 41. Hence, before the operation of the actuator 51 or before the movement of the slider 40, the regulating surfaces 43 of the slots 42 support the engaging strips 38 of the lids 33 so that the lids 33 keep closing the vent openings 27. When the actuator 51 operates to move the slider 41 along the bottom wall 7 of the case 5 or along the opening planes of the vent openings 27, the engaging strips 38 of the lids 33 slide on the guide surfaces 44 of the slots 42, so that the outward-opening areas 35 as well as the inward-opening areas 36 rotate about the rotary shafts 34 and thereby the lids 33 open the vent openings 27. In the foregoing embodiment, therefore, the simple configuration to move the slider 41 by the actuator 51 easily rotates and opens all the closed lids 33 at the same time with the same opening areas.

Although the foregoing embodiment has been described as is applied to the airbag apparatus M for a front passenger's seat, the present invention may be applied to other kinds of airbag apparatuses, for example, for a driver's seat, for pedestrian protection, and so on.

What is claimed is:

1. An airbag apparatus comprising:
   an airbag inflatable with inflation gas;
   an inflator supplying inflation gas to the airbag;
   a case, housing and holding the airbag and the inflator; and
   a vent mechanism operated by an actuator exhausting inflation gas filled inside the airbag, the vent mechanism including:
   a vent opening formed on the case releasing the inflation gas filled inside the airbag;
   a lid formed on the case to close off the vent opening, the lid being pivotally supported at a periphery of the vent opening by a rotary shaft thereof disposed across the vent opening to rotate about the rotary shaft to open the vent opening, the lid including on one side of the rotary shaft an outward-opening area configured to rotate outward of the case and on an other side of the rotary shaft an inward-opening area configured to rotate inward of the case; and
   a closing mechanism connected to the actuator and holding the lid to keep the vent opening closed when the actuator is inactive and releasing the lid to open the vent opening upon operation of the actuator,
   wherein:
   the vent mechanism includes a plurality of the lids;
   the lids are arranged in such a relation to an inlet opening of the airbag to admit inflation gas that the lids provide equal areas permitting inflation gas to be exhausted relative to the center of the inlet opening of the airbag at opening the vent opening;
   the closing mechanism conducts the hold and release of all the lids at the same time;
   the closing mechanism includes a sliding element disposed on an outer side of the case for sliding movement in parallel with opening planes of the vent openings upon operation of the actuator;
   each of the lids includes an engaging strip for engagement with the sliding element, the engaging strip being disposed at a leading end of the outward-opening area of the lid facing away from the rotary shaft and located outside of the case; and
   the sliding element includes slots engageable with the engaging strips; each of the slots having a regulating surface for regulating the engaging strip to keep the outward-opening area of the lid closing off the vent opening before the sliding movement of the sliding element and a guide surface extending diagonally with respect to the opening plane of the vent opening for sliding on the engaging strip to guide the outward-opening area of the lid to open upon the sliding movement of the sliding element.

2. The airbag apparatus of claim 1, wherein:
   the rotary shaft of the lid is disposed to extend across a center of the vent opening; and
   the outward-opening area and inward-opening area close off equal areas of the vent opening.

3. The airbag apparatus of claim 1, wherein an arrangement of gas discharge ports of the inflator with respect to the inlet opening of the airbag is such that areas permitting discharge of inflation gas are even relative to the center of the inlet opening of the airbag.

4. The airbag apparatus of claim 1, wherein a rib for guiding the opening of the inward-opening area is formed on a periphery of an area to be closed by the inward-opening area of each of the vent openings on an inner side of the case.

5. The airbag apparatus of claim 1, wherein:
   when the lid closes off the vent opening, an outer edge of the outward-opening area is pressed against a periphery of the vent opening on an outer side of the case while an outer edge of the inward-opening area is pressed against a periphery of the vent opening on an inner side of the case.

6. The airbag apparatus of claim 1, wherein the outward-opening area and inward-opening area of the lid include reinforcing ribs formed along respective outer edges.

* * * * *